US008661230B2

(12) United States Patent
Alexander et al.

(10) Patent No.: US 8,661,230 B2
(45) Date of Patent: Feb. 25, 2014

(54) ALLOCATION OF COUNTERS FROM A POOL OF COUNTERS TO TRACK MAPPINGS OF LOGICAL REGISTERS TO PHYSICAL REGISTERS FOR MAPPER BASED INSTRUCTION EXECUTIONS

(75) Inventors: Gregory W. Alexander, Pflugerville, TX (US); Brian D. Barrick, Pflugerville, TX (US); John W. Ward, III, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 13/088,298

(22) Filed: Apr. 15, 2011

(65) Prior Publication Data

US 2012/0265971 A1    Oct. 18, 2012

(51) Int. Cl.
*G06F 9/30* (2006.01)
(52) U.S. Cl.
USPC .......................................... 712/217; 712/220
(58) Field of Classification Search
USPC .................................................. 712/217, 231
See application file for complete search history.

(56) References Cited

U.S. PATENT DOCUMENTS

| 6,094,716 | A  | * | 7/2000 | Witt ................................ 712/23 |
| 6,505,293 | B1 |   | 1/2003 | Jourdan et al. |
| 6,519,696 | B1 | * | 2/2003 | Henry et al. ................... 712/222 |
| 6,553,483 | B1 |   | 4/2003 | Jourdan et al. |
| 6,560,671 | B1 | * | 5/2003 | Samra et al. ................... 711/108 |
| 6,594,754 | B1 |   | 7/2003 | Jourdan et al. |
| 6,625,723 | B1 |   | 9/2003 | Jourday et al. |
| 8,230,433 | B2 | * | 7/2012 | Chiu et al. ..................... 718/104 |
| 2003/0135715 | A1 | * | 7/2003 | Jourdan et al. ................ 712/218 |
| 2004/0015904 | A1 | * | 1/2004 | Jourdan et al. ................ 717/141 |
| 2005/0120191 | A1 |   | 6/2005 | Akkary et al. |
| 2009/0063831 | A1 | * | 3/2009 | Ekman .......................... 712/239 |
| 2009/0228692 | A1 |   | 9/2009 | Barrick et al. |

OTHER PUBLICATIONS

UK Intellectual Property Office, Search and Examination Report, GB12006448.1, dated Jul. 16, 2012, 3 pages.
U.S. Appl. No. 13/450,429, filed Apr. 18, 2012, Gregory W. Alexander et al, International Business Machines Corporation, 41 pages.
U.S. Appl. No. 14/065,795, filed Oct. 29, 2013, In re Alexander, 43 pages.
Deutsch, L. Peter; Bobrow, Daniel G., "An Efficient, Incremental, Automatic Garbage Collector", Commun. ACM, vol. 19, 1976, No. 9, pp. 522-526—ISSN 0001-0782, retrieved via the internet on Nov. 18, 2013 from http://doi.acm.org/10/1145/360336.360345, 5 pages.

(Continued)

*Primary Examiner* — Andrew Caldwell
*Assistant Examiner* — Yuqing Xiao
(74) *Attorney, Agent, or Firm* — Matthew W. Baca; Amy J. Pattillo

(57) ABSTRACT

A mapper unit of an out-of-order processor assigns a particular counter currently in a counter free pool to count a number of mappings of logical registers to a particular physical register from among multiple physical registers, responsive to an execution of an instruction by the mapper unit mapping at least one logical register to the particular physical register. The number of counters is less than the number of physical registers. The mapper unit, responsive to the counted number of mappings of logical registers to the particular physical register decremented to less than a minimum value, returns the particular counter to the counter free pool.

7 Claims, 8 Drawing Sheets

(56) References Cited

OTHER PUBLICATIONS

Jourdan, Stephen, "A Novel Renaming Scheme to Exploit Value Temporal Locality Through Physical Register Reuse and Unification", Proceedings of the 31st Annual ACM/IEEE International Symposium on Microarchitecture, Dallas, Texas, US, ACM, 1998 (Micro 310), pp. 216-225, ISBN 1-58113-016-3, retrieved via the internet on Nov. 18, 2013 from http://dl.acm.org/citation.cfm?id=290940.290985, 10 pages.

Petric, V.; Bracy, A; Roth, A., "Three Extensions to Register Integration", Proceedings, 35th Annual IEEE/ACM International Symposium on MicroArchitecture, 2002 (MICRO-35), pp. 37-47, ISSN 1072-4451, retrived via the internet on Nov. 18, 2013 from http://ieeexplore.ieee.org/stamp/stamp.jsp?tp=&arnumber=1176237, 11, pages.

\* cited by examiner

ALLOCATION OF COUNTERS FROM A POOL OF COUNTERS TO TRACK MAPPINGS OF LOGICAL REGISTERS TO PHYSICAL REGISTERS FOR MAPPER BASED INSTRUCTION EXECUTIONS

BACKGROUND

1. Technical Field

This invention relates in general to microprocessor performance and more particularly to dynamically assigning counters to physical registers from a pool of counters to track mappings of logical registers to physical registers for mapper based instruction executions.

2. Description of the Related Art

A processor may execute one or more types of instructions. One type of instructions may require copying the contents of one register to another register. For example, move register type instructions are a type of instruction that involves copying a value in one register to another register. In one example, instructions that require copying the contents of one register to another register may be used to preserve data that may be altered in response to one instruction, but may be needed by a subsequent instruction. Because of the frequency of instructions such as move register instructions that require copying the contents of one register to another register, a mapper unit of a processor may execute move register instructions by mapping multiple logical registers to a single physical register to effectively copy the contents of one logical register into another logical register without having to physically move the contents from one physical register to another physical register.

BRIEF SUMMARY

When a mapper unit of an out-of-order processor executes move register instructions by mapping multiple logical registers to a single physical register, the present invention efficiently tracks a count of the number of logical registers currently mapped to a physical register such that the physical register mapped to will not be released until there are no remaining mappings of logical registers to the physical register. In particular, for mapper unit based move register instruction execution, the mapper unit efficiently counts the number of logical registers currently mapped to a single physical register without requiring additional hardware overhead for every physical register.

According to one embodiment of the invention, a mapper unit of an out of order processor executes instructions that require copying one register to another register, such as a move register instruction, bypassing the issue queue and execution units. The mapper unit maintains a pool of tracking counters available for dynamically assigning to a particular physical register, only when needed, to track the number of logical register mappings to the particular physical register mapped to for instruction executions by the mapper unit.

In one embodiment, a microprocessor comprises a plurality of physical registers, a plurality of counters, wherein a number of the plurality of counters is less than a number of the plurality of physical registers, a mapper unit operative to assigning a particular counter from among the plurality of counters currently in a counter free pool to count a number of mappings of logical registers from among the plurality of logical registers to a particular physical register responsive to an execution of an instruction by the mapper unit mapping at least one logical register from among the plurality of to registers to the particular physical register, wherein a number of the plurality of counters is less than a number of the plurality of physical registers, and the mapper unit, responsive to the counted number of mappings of logical registers to the particular physical register decremented to less than a minimum value, operative to return the particular counter to the counter free pool.

In another embodiment, a computer program product for counting mappings of logical registers to physical registers in a processor for instruction executions by a mapper unit of the processor is tangibly embodied in a computer-readable storage medium. The computer prom products comprises computer executable instructions which cause a computer to assign particular counter from among a plurality of counters currently in a counter free pool to count a number of mappings of logical registers from among a plurality of logical registers to a particular physical register from among a plurality of physical registers, responsive to an execution of an instruction by a mapper unit mapping at least one logical register from among the plurality of logical registers to the particular physical register, wherein the number of the plurality of counters is less than a number of the plurality of physical registers. The computer program products comprises computer executable instructions which cause a computer, responsive to the counted number of mappings of logical registers to the particular physical register decremented to less than a minimum value, to return the particular counter to the counter free pool.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
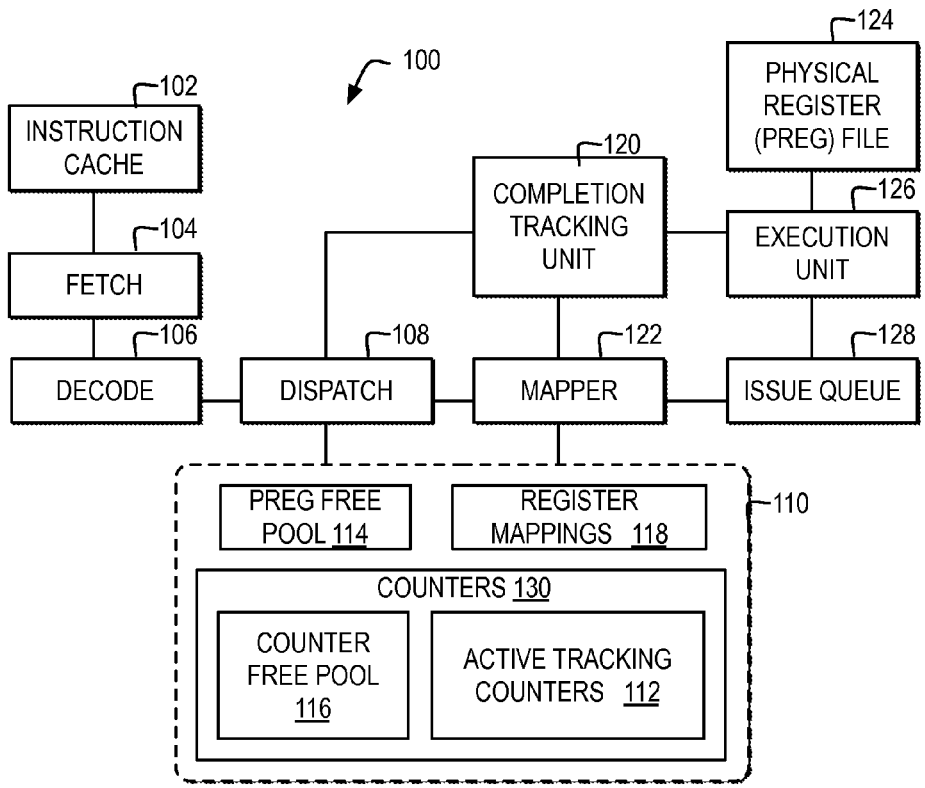
FIG. 1 is a block diagram illustrating an out-of-order microprocessor for dynamically assigning counters from a counter free pool to physical registers to count logical register mappings to physical registers for mapper based move register instruction executions.

With reference now to the figures, FIG. 1 illustrates a block diagram of an out-of-order microprocessor for dynamically assigning counters from a counter free pool to physical registers to count logical register mappings to physical registers for mapper based move register instruction executions. In the example, a microprocessor 100 includes a fetch unit 104 that fetches instructions from instruction cache 102 and a decode unit 106 that decodes the fetched instructions. The type and level of decoding performed by decode unit 106 may depend on the type of architecture implemented. In one example, for a Complex Instruction Set Computer (CISC) architecture, decode unit 106 decodes a complex instruction into one or more microinstructions, however, for a Reduced Instruction Set Computer (RISC) architecture or VLIW (Very Large Instruction Word) architecture, instructions are not decoded into microinstructions. It will be apparent to one skilled in the art that additional or alternate units, registers, cache, and other elements may be implemented within microprocessor 100 for holding, fetching, and decoding instructions. As described herein, microprocessor 100 may also be referred to as a processor.

In the example, microprocessor 100 includes a dispatch unit 108 for receiving decoded instructions or groups of decoded instructions from decode unit 106 and dispatching the instructions. In the example, dispatch unit 108 dispatches instructions to a completion tracking unit (CTU) 120, such as a global completion table, and a mapper unit 122. Dispatch unit 108 may verify that mapper unit 122 is ready to receive instructions prior to dispatching the instructions to mapper unit 122. In addition, although not depicted, dispatch unit 108 may dispatch instructions to additional or alternate units and registers within microprocessor 100.

Completion tracking unit 120 tracks instructions received from dispatch unit 108 until each instruction is completed. In one example, in general, mapper unit 122 maps logical registers to physical registers, may rename operands of instructions to refer to logical registers, and sends the renamed operands of instructions to an issue queue 128. Register mappings 118 represent the current mappings of logical registers to physical registers. Physical register (PREG) free pool 114 represents the pool of physical registers available for mapper unit 122 to map to logical registers. In one example, issue queue 128 includes a scheduler for scheduling execution of instructions by execution unit 126 and may include or access one or more buffers in one or more functional units, where the one or more buffers hold renamed instructions received from mapper unit 122, for execution by execution unit 126. Execution units 126 may include one or more physical execution units. Once execution unit 126 writes to or reads from a physical register in physical register file 124 for finishing execution of an instruction received from issue queue 128, issue queue 128 may retire the instruction from any buffers and mark the instruction complete in completion tracking unit 120.

In the example, when mapper unit 122 receives instructions that require copying the contents of one register to another register, such as move register instructions, mapper unit 122 includes units to execute the move register instruction, rather than sending the move instruction to issue queue 128 for scheduling and execution by execution unit 126. In one example, execution of move register instructions by mapper unit 122 is also referred to as move register instruction short circuiting. Mapper unit 122 performs move register instruction execution to effectively copy the contents of one register to another register by mapping multiple logical registers to a single physical register, executing the move register instruction without requiring movement of content from one physical register to another physical register and without requiring any entry of the instruction in issue queue 128 or execution by execution unit 126. In addition, by mapper unit 122 executing move register instructions, the processing of move instructions is offloaded from execution unit 126, leaving execution unit 126 free to process other types of instructions more efficiently and facilitating processing of instructions by microprocessor 100 out of the original order of the instruction Completion tracking unit 120 detects the completion of move register instructions from mapper 122 and detects the completion of other types of instructions from issue queue 128. Completion tracking unit 120 determines when to send completion indicators to mapper unit 122 for mapper unit 122 to use in determining whether to release physical registers from register mappings 118 back to PREG free pool 114. In particular, since mapper unit 122 implements move register short circuiting for move register instructions, mapper unit 122 may map multiple logical registers to a single physical register during move register short circuiting and even though the instruction triggering the initial physical register allocation is retired, there may be one or more move register based logical registers pointing to the physical register. Therefore, for mapper unit 122 to determine whether to release a PREG to PREG free pool 114 upon receipt of an instruction completion indicator, mapper unit 122 tracks whether there are any remaining logical register mappings to the physical register before releasing a PREG back to PREG free pool 114.

To minimize the overhead required for tracking whether there are any move register based logical register mappings to the PREG before releasing a PREG back to PREG free pool 114, dispatch unit 108 maintains a pool of counters available for activation and assignment to PREGs within register mappings 118, responsive to a move register instruction execution, to track a number of logical register mappings to a PREG. In the example, multiple counters 130 are allocated within hardware where the number of counters in multiple counters 130 is less than the number of physical registers allocated. A counter free pool 116 represents a selection of free counters from among counters 130 currently available for activation and assignment to a PREG. In the example, active tracking counters 112 represents a selection of counters from among counters 130 activated and associated with particular PREGs, for counting a number of mappings of logical registers to each particular PREG.

Figure 2:
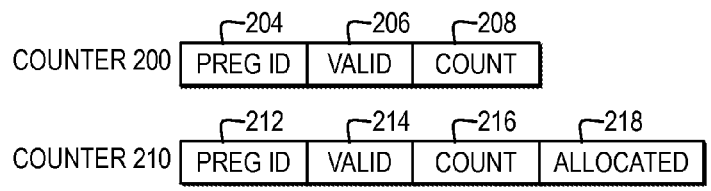
FIG. 2 is a block diagram illustrating one example of the elements of a counter for tracking active mappings of logical registers to a physical register.

Referring now to FIG. 2, FIG. 2 illustrates one example of the elements of a counter for tracking mappings of logical registers to a physical register. In the example, a counter 200 for tracking logical register mappings to a physical register includes a PREG ID 204, a valid bit 206, and a count 208. In one example, when mapper unit 122 activates counter 200 and sets the count for the counter, mapper unit 122 activates counter 200 by setting valid bit 206 to "1" and assigns counter 200 by inserting the pointer for the physical register into PREG ID 204 and setting the count by setting count 208 to "2". In one example, when mapper unit 122 releases counter 200, mapper unit 122 sets valid bit 206 to "0". In one example, counters with valid bit 206 set to "0" are represented within counter free pool 116 and counters with valid bit 206 set to "1" are represented within active tracking counters 112. In the example, valid bit 206 represents a bit for tracking the valid state of a counter, where a valid state of "valid" or "1" indicates that the current count is valid and a valid state of "invalid" or "0" indicates that the current count is not valid. It will be apparent to one of ordinary skill in the art that counters for tracking active mappings of logical registers to a physical register, such as counter 200, may include additional or alternate elements.

In another example, referring still to FIG. 2, counter 210 includes PREG ID 212, valid bit 214, and count 216, as described with reference to counter 200, however counter 210 also includes an allocated bit 218. In one example, mapper unit 122 may be set to automatically reserve a counter when a move register instruction is received, prior to determining whether there is already a counter with a PREG ID matching the PREG in active tracking counters 112 for the move register instruction. In this example, where mapper unit 122 reserves a counter for a move register instruction and then determines whether there is already a counter with a PREG ID matching the PREG for the move register instruction in active tracking counters 112, mapper unit 122 sets allocated bit 218 to indicate a reservation, however, valid bit 214 is not set until a determination is made whether there is already a counter assigned with a PREG ID matching the PREG for the move register instruction or whether the counter is needed.

Returning to FIG. 1, mapper unit 122 manages dynamic assignment of counters 130 to PREGs by comparing a mapped to PREG for a move register instruction with the PREG IDs assigned to active tracking counters 122. If mapper unit 122 detects a hit indicating the mapped to PREG for a move register instruction matches a PREG ID assigned to a counter in active tracking counters 122, mapper unit 122 increments the count of the matching counter. If mapper unit 122 does not identify a match with a PREG ID of a counter in active tracking counters 122, mapper unit 122 assigns a counter from counter free pool 116 by setting the PREG ID of the counter to the PREG, setting the count to "2", and setting a valid bit for the counter to "1". By setting the count to "2" when assigning a counter to a PREG, mapper unit 122 accounts for the original logical register mapping to the PREG and the move register based logical register mapping to the PREG. The move register based logical register mapping to the PREG may also be referred to as a move register alias.

Mapper unit 122 manages the dynamic release of counters 130 to counter free pool 116 by comparing a mapped to PREG for an instruction completion indicator with the PREG IDs assigned to active tracking counters 122 when mapper unit 122 sends a deallocation request for the PREG to counters 130. Mapper unit 122 may detect conditions indicating it is time to release an LREG mapping to a PREG, and generate a deallocation request for the PREG, responsive to one or more conditions including, but not limited to, receiving a completion indicator for an instruction or group of instructions from completion tracking unit 120, mapper unit 122 sending completed instructions to a checkpoint state, mapper unit 122 flushing checkpointed instructions, or detecting a PREG flushed from register mappings 118. Mapper unit 122 compares the PREG in the deallocation request with the PREGs assigned to active tracking counters 112. If mapper unit 122 detects a hit in active tracking counters 112, mapper unit 122 decrements the counter currently assigned to the PREG. When the counter for a PREG is decremented to "0" or "1", mapper unit 122 releases the tracking counter to counter free pool 116, if not already in counter free pool 116, by setting the valid bit for the tracking counter to "0". If the counter for the PREG is decremented to "1", but not "0", the PREG must remain active, but the PREG no longer requires a counter for tracking a number of mappings to the PREG. If the counter for a PREG is decremented to "0" or mapper unit 122 does not detect a hit in counters 130 for PREG in a deallocation request, mapper unit 122 triggers the release of the PREG from register mappings 118 to PREG free pool 114.

In the example illustrated, by providing counters available for activation and assignment in counter free pool 116 and only dynamically assigning a counter for a PREG, as needed, when the PREG is mapped to in register mappings 118 for mapper unit based move register instruction execution, mapper unit 122 implements move register short circuiting without requiring a separate counter for each of the total available PREGs and without requiring counting in association with an allocated PREG unless an instruction execution maps a logical register to a physical register that already has one or more logical registers mapped to the physical register. Reducing the number of counters required for counting logical register mappings for mapper unit based move register instructions allows for a greater number of PREGs to be available with minimized overhead assumed by counters. In addition, while the invention is described with reference to mapper unit 122 activating and assigning a counter from counter free pool 116 when an instruction execution maps a second logical register to a physical register that already has one or more logical registers mapped to the physical register, in another example, mapper unit 122 may activate and assign a counter from counter free pool 116 to a physical register when a first logical register is mapped to the physical register, wherein the allocated counter is set to "1" and the counter is incremented for each additional mapping of an additional logical register to the physical register.

While the invention is described with reference to mapper unit 122 executing move register instructions, mapper unit 122 may also execute other types of instructions by mapping multiple logical registers to a same physical register and may dynamically assign counters from counter free pool 122 to track a number of mappings of logical registers to a same physical register for mapper based execution of other types of instructions.

In the example, mapper unit 122, dispatch unit 108, and other units of microprocessor 100 may access and update mapping data 110, which may include PREG status list 114, counter free pool 116, register mappings 118, and active tracking counters 112. In one example, one or more units illustrated within mapping data 110 may reside within dispatch unit 108 and mapper unit 122, may reside within registers independent of a particular functional unit, or may be shared between multiple processor cores.

One of ordinary skill in the art will appreciate that the functional units, cache, and registers of microprocessor 100 may include additional or alternate functional units, cache, and registers from those illustrated in FIG. 1 and that the functional units, cache, and registers may be interconnected in additional or alternate configurations differing from the interconnections depicted in FIG. 1.

Figure 3:
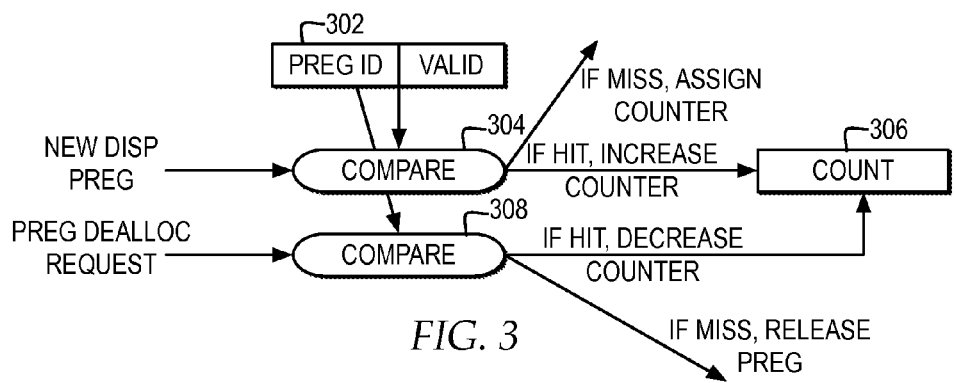
FIG. 3 is a block diagram illustrating one example of units implemented by the mapper unit for controlling the count of active tracking counters that are dynamically assigned to PREGs as needed.

With reference now to FIG. 3, a block diagram illustrates one example of units implemented by mapper unit 122 for controlling the count of active tracking counters that are dynamically assigned to PREGs as needed.

In the example, at dispatch of a move register instruction, indicated in the figure as "new disp PREG", compare unit 304 compares each valid counter PREG ID 302 with a PREG looked up for the move register instruction. If compare unit 304 detects a hit, then count 306 associated with the matching counter is incremented. If compare unit 304 detects a miss, then a new counter is allocated for the PREG, the valid bit is set in the counter, and the count for the counter is set to "2".

In the example, at release time, when a deallocation request for a PREG is sent, indicated in the figure as "PREG dealloc request", compare unit 308 compares the PREG in the deallocation request with each valid counter PREG ID 302. If compare unit 308 detects a hit, then count 306 associated with the matching counter is decremented. If compare unit 306 detects a miss, then release of the PREG is triggered.

One of ordinary skill in the art will appreciate that mapper unit 122 may implement additional or alternate units and registers for controlling the number currently set in the count of active tracking counters assigned to PREGs and may implement additional or alternate units to perform the assignment of counters to PREGs and to perform the release of PREGs.

Figure 4:
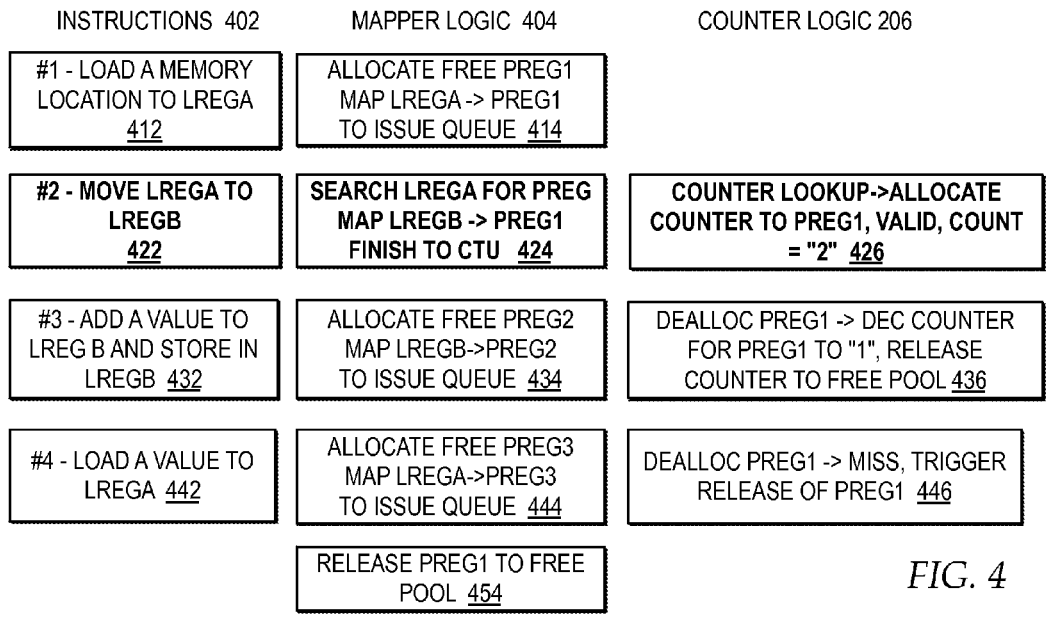
FIG. 4 is a block diagram illustrating one example of steps performed by the mapper unit to handle the dynamic allocation of counters to PREGs for move register instruction executions.

Referring now to FIG. 4, a block diagram illustrates one example of steps performed by the mapper unit to handle the dynamic allocation of counters to PREGs for move register instruction executions. In the example, a first column 402 includes multiple examples of types of instructions received by mapper unit 122, including a move register instruction 422 and non-move register instructions 412, 432, and 442. A second column 404 includes steps performed by mapper logic of mapper unit 122 for managing the allocation of physical registers and the mapping of logical registers to physical registers. A third column 406 includes steps performed by counter logic 406 of mapper unit 122 for managing the dynamically assigned counters available for dynamic assignment to PREGs as needed responsive to move register instruction executions.

In the example, a first instruction 412 requires loading a memory location to LREGA. As illustrated at reference numeral 414, mapper unit 122 allocates a free PREG1 from the PREG free pool to the instruction, maps LREGA to PREG1, and sends the operands for the instruction to issue queue 128.

In the example, a second instruction 422 requires moving LREGA to LREGB. As illustrated at reference numeral 424, mapper unit 122 detects the move register instruction and searches LREGA for the mapped to PREG, which is set to PREG1 following instruction 412. Next, mapper unit 122 executes the move register instruction by mapping LREGB to PREG1, while LREGA is also mapped to PREG1, and submits a finish indicator to completion tracking unit 120 for the instruction, bypassing issue queue 128 and execution units. In addition, the counter logic of mapper unit 122 performs a counter lookup with PREG1 to determine whether there is already a counter assigned to PREG1. In the example, the lookup returns a miss, therefore a counter is allocated from the counter free pool to PREG1, the valid bit for the counter is set to "1", and the count for the counter is set to "2". Although not depicted in the example, although completion tracking unit 120 has received a finish indicator for instruction 422, completion tracking unit 120 does not indicate completion of instruction 422 until completion tracking unit 120 receives a finish indicator for instruction 412 from issue queue 128 indicating the data is loaded. When instruction 412 completes, PREG1 will go to an architected state as LREGA and the next allocation of LREGA will trigger mapper unit 122 to issue a deallocation request for PREG1. When instruction 422 completes, PREG1 will go to an architected state as LREGB.

In the example, a third instruction 432 requires adding a value to LREGB and storing the result in LREGB. As illustrated at reference numeral 434, mapper unit 122 allocates a free PREG2 from the PREG free pool to the instruction, maps LREGB to PREG2, and sends the operands for the instruction to issue queue 128. When instruction 432 completes PREG2 will go to an architected state as LREGB, PREG1 is removed from the architected state for LREGB, and mapper unit 122 will issue a deallocation request for PREG1 because one of the counted logical mappings to PREG1 is released. Counter logic receives the deallocation request for PREG1 and performs a lookup of PREG1 in the active tracking counters. In the example, the lookup returns a hit and the count for the counter for PREG1 is decremented to "1" to reflect that only one logical register mapping to PREG1 remains. PREG1 remains busy, but the counter assigned to PREG1 is released to the free counter pool. Although not depicted in the example, instruction 432 may wait in issue queue 128 until instruction 412 finishes and returns the data needed for instruction 432 to execute.

In the example, a fourth instruction 442 requires loading a value to LREGA. As illustrated at reference numeral 444, mapper unit 122 allocates a free PREG3 from the PREG free pool to the instruction, maps LREGA to PREG3, and send the operands for the instruction to issue queue 128. When instruction 442 completes, the completion of instruction 442 represents the next allocation of LREGA, PREG3 will go to an architected state as LREGA, PREG1 is removed from the architected state for LREGA, and the mapper will issue a deallocation request for PREG1 because one of the counted logical mappings to PREG1 is removed. Counter logic receives a deallocation request for PREG1 and performs a lookup of PREG1 in the active tracking counters. In the example, the lookup returns a miss because the counter previously assigned to PREG1 was already released to the free counter pool and mapper unit 122 triggers the release of PREG1 to the free PREG pool.

While in the example, instruction 432 is illustrated as completing prior to instruction 442, in another example, instruction 442 may complete prior to instruction 432, the completion of instruction 442 would trigger the steps illustrated at reference numeral 436 and the completion of instruction 432 would trigger the steps illustrated at reference numeral 446. In addition, while in the example instructions 436 and 446 are triggered responsive to the completion of an instruction that replaces one of the counted mappings to a physical register, in other example, instructions 436 and 446 may be triggered responsive to flushing out mappings and other events that indicate that a particular mapping of a logical register to a physical register is complete.

Figure 5:
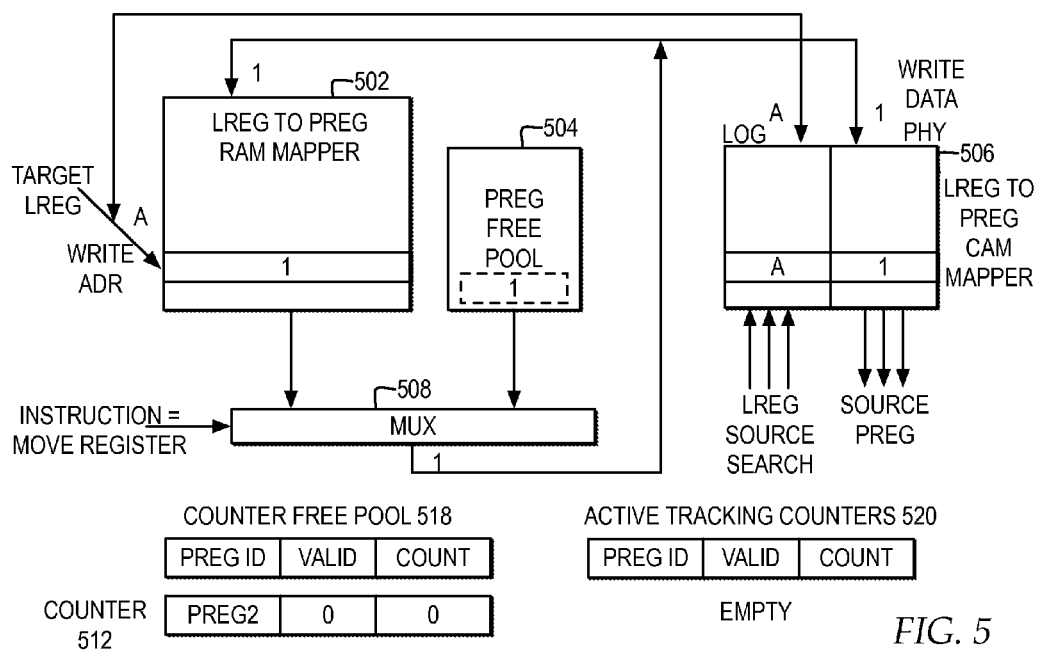
FIG. 5 is a block diagram illustrating an example of an original allocation of a physical register in register mappings by a mapper unit that implements a random access memory (RAM) mapper and a content addressable memory (CAM) mapper to execute move register instructions.

With reference now to FIG. 5, a block diagram illustrates an example of an original allocation of a physical register in register mappings by a mapper unit that implements a random access memory (RAM) mapper and a content addressable memory (CAM) mapper to execute move register instructions. In the example, mapper unit 122 implements both a LREG to PREG CAM mapper 506 and an LREG to PREG RAM mapper 502 to implement operand mapping, including move register instruction execution. In the example, mapper unit 122 receives instruction 412 to load a memory location to LREGA, where LREGA is the target LREG. In the example, a multiplexer (MUX) 508 selects inputs from RAM mapper 502 if the instruction received is a move register instruction and otherwise selects inputs from PREG free pool 504. In the example, the received instruction is not a move register instruction, so MUX 508 selects PREG1 from free pool 504 and broadcasts PREG1 to RAM mapper 502 and CAM mapper 506. RAM entry LREGA within RAM mapper 502 is written with PREG1 and a new CAM entry created in CAM mapper 506 maps LREGA to PREG1. Mapper unit 122 passes operands for instruction 412 to issue queue 128 for execution scheduling.

In the example, counter free pool 518 includes an available counter 512, however active tracking counters 520 is empty. Mapper unit 122 does not need to assign a counter to PREG1 to track the mapping of LREGA to PREG1 because no move register instruction execution has been performed.

Figure 6:
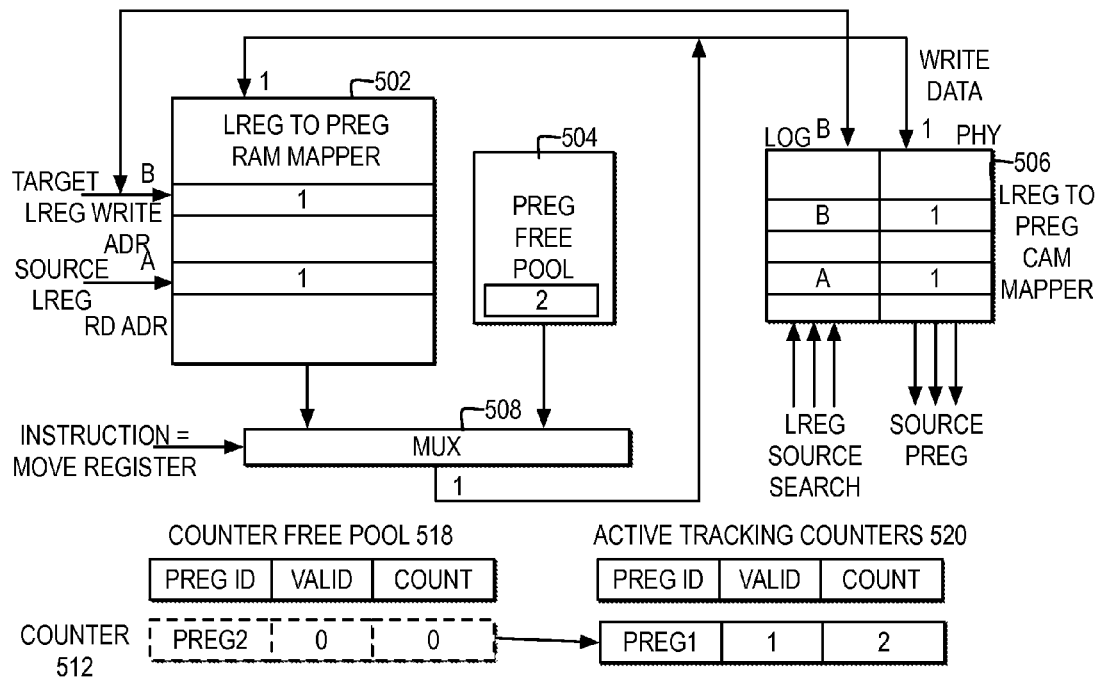
FIG. 6 is a block diagram illustrating an example of a move register instruction execution by a mapper unit that implements a RAM mapper and a CAM mapper to execute move register instructions and dynamically allocates counters to physical registers for move register instruction executions.

Referring now to FIG. 6, a block diagram illustrates an example of a move register instruction execution by a mapper unit that implements a RAM mapper and a CAM mapper to execute move register instructions and dynamically allocates counters to physical registers for move register instruction executions. In the example, mapper unit 122 receives instruction 422 to move LREGA to LREGB. Instruction 422 is a move register instruction. In the example, LREGA is the source LREG to be read from RAM mapper 502 and LREGB is the target LREG to be written to in RAM mapper 502. LREGA is currently assigned PREG1 in RAM mapper 502. MUX 508 broadcasts the input from RAM mapper 502 of PREG1 assigned to LREGA to a write data input of RAM mapper 502 and CAM mapper 506. RAM mapper 502 receives LREGB as the target LREG to be written to and maps PREG1 to LREGB in RAM mapper 502. In addition, CAM mapper 506 adds an entry and maps LREGB to PREG1, effectively mapping both LREGA and LREGB to PREG1 to copy the contents of LREGA to LREGB without having to move the contents of PREG1 to an new register.

Mapper unit 122 does not pass operands for instruction 422 to issue queue 128 because mapper unit 122 has already executed the move register instruction of instruction 422 by mapping LREGB to the same physical register as LREGA. Mapper unit 122 broadcasts a finish indicator to completion tracking unit 120 for instruction 422, without dispatch of instruction 422 to issue queue 128 or execution unit 126.

Mapper unit 122 also performs a lookup in active tracking counters 520 for a counter already assigned to PREG1 for the dispatched move instruction in instruction 422. Mapper unit 122 detects a miss and assigns counter 512 to PREG1 by setting the PREG ID of counter 512 to PREG1, setting the valid bit to "1", and setting the count to "2", representing a count of the logical register to physical register mappings for each of instruction 412 and instruction 422. It is important to note that the counters in counter free pool 518 are available for assignment to any of the physical registers as needed, such that as illustrated in the example, counter 512, which was previously assigned to PREG2, is now assigned to PREG1 in active tracking counters 520.

Figure 7:
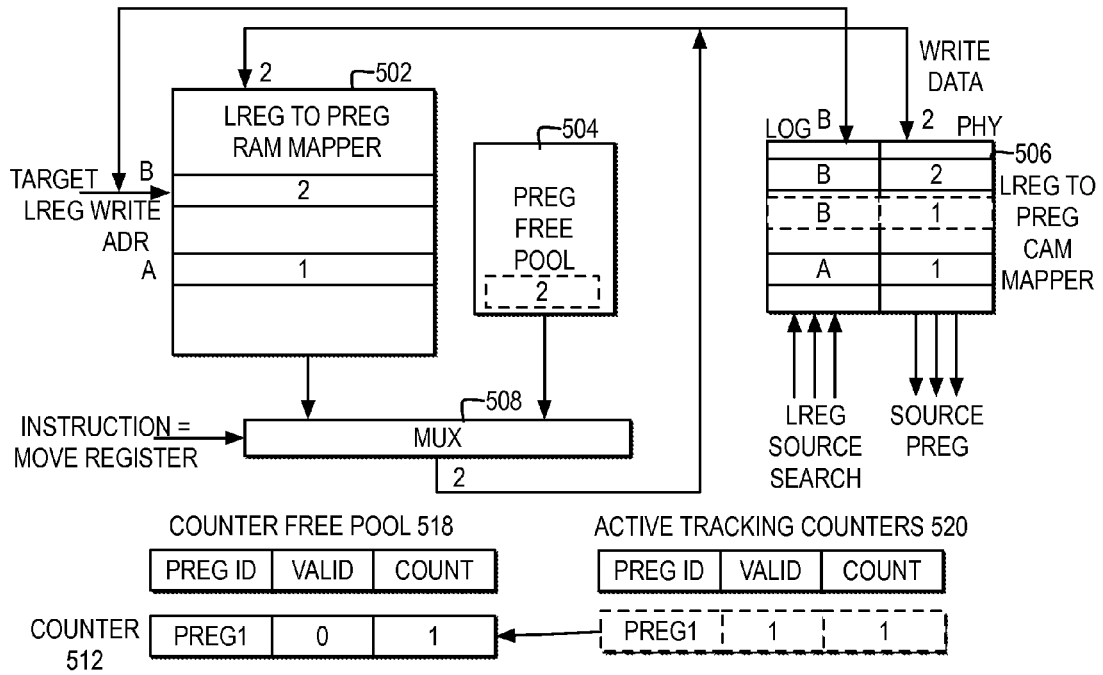
FIG. 7 is a block diagram illustrating an example of an instruction following a move register instruction that allocates to an LREG named in the move register instruction.

With reference now to FIG. 7, a block diagram illustrates an example of an instruction following a move register instruction that allocates to an LREG named in the move register instruction. In the example, mapper unit 122 receives instruction 432 to add a value to LREGB and store the result in LREGB. LREGB is currently mapped to the same physical register PREG1 as LREGA from the move register instruction execution performed by mapper unit 122 for instruction 422. In the example, for instruction 432, MUX 508 broadcasts a free register PREG2 from PREG free pool 304 since instruction 432 is not a move register instruction. CAM mapper 306 creates a new entry mapping LREGB to PREG2 and assigns PREG2 to LREGB in RAM mapper 302, where LREGB is the target LREG for instruction 432.

In the example, the operands for instruction 432 pass to issue queue 128 and are executed by execution unit 126. completion tracking unit 120 receives an indicator from issue queue 128 that instruction 432 has completed and completion tracking unit 120 sends a completion indicator for instruction 432 to mapper unit 122, either individually or for a group of completed instructions. In one example, once mapper unit 122 receives the completion indicator for instruction 432, PREG2 will go to an architected state as LREGB and mapper unit 122 removes the entry mapping LREGB to PREG1 from CAM mapper 506. In one example, when mapper unit 122 receives a completion indicator for an instruction or group of instructions, mapper unit 122 sends the completed instructions to a checkpointed state and then releases mappings associated with the checkpointed instructions, such as LREGB to PREG1. When mapper unit 122 removes the entry mapping LREGB to PREG1, mapper unit 122 triggers a deallocation request for PREG1. In the example, the deallocation request triggers a lookup of PREG1 in active tracking counters 520. Mapper unit 122 detects a hit to counter 512 in active tracking counters 520 and decrements the count. Because the count is decremented to "1", mapper unit sets the valid bit for counter 512 to "0", effectively moving counter 512 to counter free pool 518.

Figure 8:
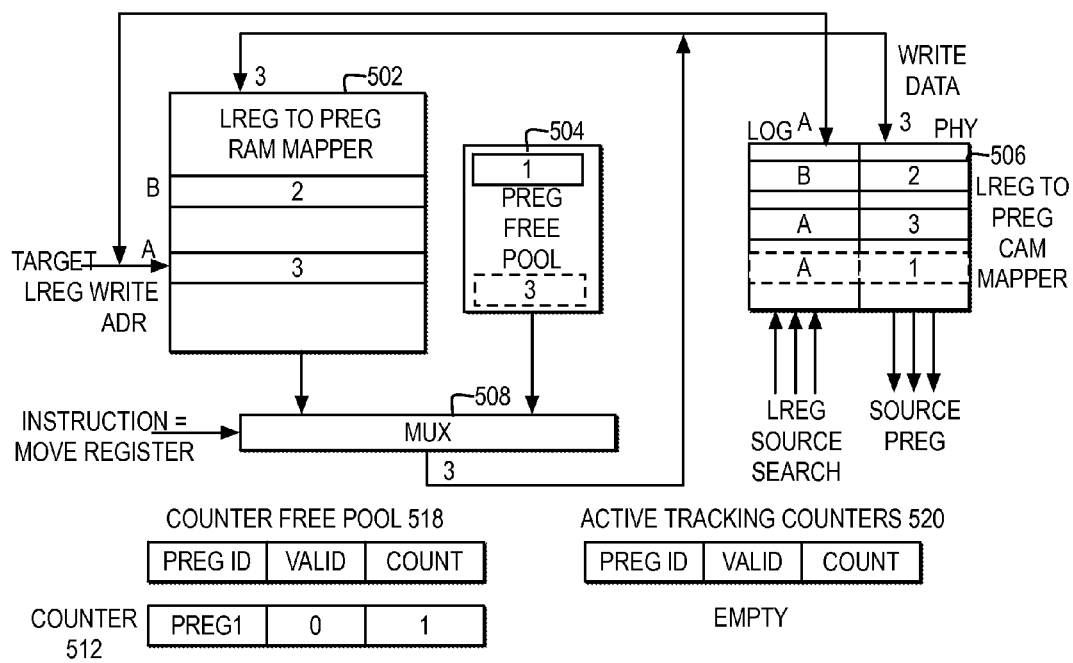
FIG. 8 is a block diagram illustrating an example of an additional instruction following a move register instruction that allocates to an LREG named in the move register instruction.

Referring now to FIG. 8, a block diagram illustrates an example of an additional instruction following a move register instruction that allocates to an LREG named in the move register instruction. In the example, mapper unit 122 receives instruction 442 to load a value to LREGA. LREGA is currently mapped to PREG1. In the example, for instruction 442, MUX 508 broadcasts a free register PREG3 from PREG free pool 304 since instruction 442 is not a move register instruction. CAM mapper 306 creates a new entry mapping LREGA to PREG3 and assigns PREG3 to LREGA in RAM mapper 302, where LREGA is the target LREG for instruction 442.

In the example, the operands for instruction 442 pass to issue queue 128 and are executed by execution unit 126. Once completion tracking unit 120 receives an indicator from issue queue 128 that instruction 442 has completed, completion tracking unit 120 sends a completion indicator for instruction 442 to mapper unit 122. In one example, once mapper unit 122 receives the completion indicator for instruction 442, PREG3 will go to an architected state as LREGA and mapper unit 122 removes the entry mapping LREGA to PREG1 from CAM mapper 506. When mapper unit 122 removes the entry mapping LREGA to PREG1, mapper unit 122 triggers a deallocation request for PREG1. In the example, the deallocation request triggers a lookup of PREG1 in active tracking counters 520. Mapper unit 122 detects a miss in active tracking counters 520 and releases PREG1 back to PREG free pool 504.

Figure 9:
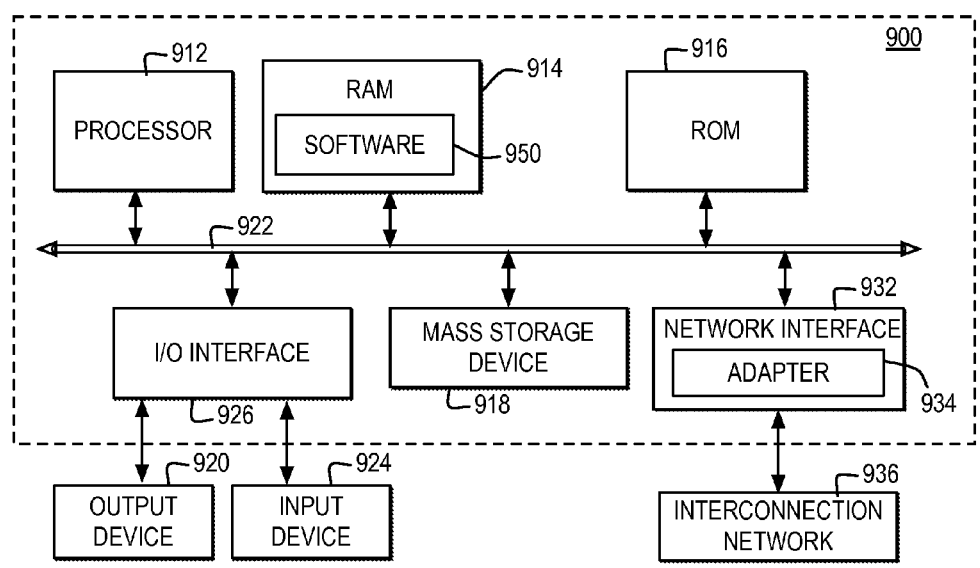
FIG. 9 is a block diagram illustrating one example of a computer system in which a microprocessor may be implemented and monitored.

FIG. 9 illustrates one example of a computer system in which a microprocessor may be implemented and monitored. The present invention may be performed in a variety of systems and combinations of systems, made up of functional components, such as the functional components described with reference to computer system 900 and may be communicatively connected to a network, such interconnection network 936.

Computer system 900 includes a bus 922 or other communication device for communicating information within computer system 900, and at least one hardware processing device, such as processor 912, coupled to bus 922 for processing information. Processor 912 may include one or more instances of the elements described with reference to FIG. 1. Bus 922 preferably includes low-latency and higher latency paths that are connected by bridges and adapters and controlled within computer system 900 by multiple bus controllers. When implemented as a server or node, computer system 900 may include multiple processors designed to improve network servicing power. Where multiple processors share bus 922, additional controllers (not depicted) for managing bus access and locks may be implemented.

Processor 912 may be at least one general-purpose processor such as IBM® PowerPC® (IBM and PowerPC are registered trademarks of International Business Machines Corporation) processor that, during normal operation, processes data under the control of software 950, which may include at least one of application software, an operating system, middleware, and other code and computer executable programs accessible from a dynamic storage device such as random access memory (RAM) 914, a static storage device such as Read Only Memory (ROM) 916, a data storage device, such as mass storage device 918, or other data storage medium. Software 950 may include, but is not limited to, code, applications, protocols, interfaces, and processes for controlling one or more systems within a network including, but not limited to, an adapter, a switch, a cluster system, and a grid environment. In addition, software 950 may include a monitoring controller for monitoring the performance of elements within processor 912 and dynamically adjusting settings of hardware elements within processor 912 to improve performance. Moreover, software 950 may perform one or more of the operations described with reference to the functional units of processor 100 in FIG. 1.

In one embodiment, the operations performed by processor 912 may control the operations of flowchart of FIGS. 10-13 and other operations described herein. Operations performed by processor 912 may be requested by software 950 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 918, a random access memory (RAM), such as RAM 914, a read-only memory (ROM) 916, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 900, partly on the user's computer, as a stand-alone software package, partly on the user's computer and partly on a remote computer or entirely on the remote computer or server. In the latter scenario, the remote computer may be connected to the user's computer through any type of network, such as interconnection network 936, through a communication interface, such as network interface 932, over a network link that may be connected, for example, to interconnection network 936.

In the example, network interface 932 includes an adapter 934 for connecting computer system 900 to interconnection network 936 through a link. Although not depicted, network interface 932 may include additional software, such as device drivers, additional hardware and other controllers that enable communication. When implemented as a server, computer system 900 may include multiple communication interfaces accessible via multiple peripheral component interconnect (PCI) bus bridges connected to an input/output controller, for example. In this manner, computer system 900 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 900, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 900, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 932, the network link to interconnection network 936, and interconnection network 936 may use electrical, electromagnetic, or optical signals that carry digital data streams. The signals through the various networks and the signals on interconnection network 936, the network link to interconnection network 936, and network interface 932 which carry the digital data to and from computer system 900, may be forms of carrier waves transporting the information.

In addition, computer system 900 may include multiple peripheral components that facilitate input and output. These peripheral components are connected to multiple controllers, adapters, and expansion slots, such as input/output (I/O) interface 926, coupled to one of the multiple levels of bus 922. For example, input device 924 may include, for example, a microphone, a video capture device, an image scanning system, a keyboard, a mouse, or other input peripheral device, communicatively enabled on bus 922 via I/O interface 926 controlling inputs. In addition, for example, output device 920 communicatively enabled on bus 922 via I/O interface 926 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 9 may vary. Furthermore, those of ordinary skill in the art will appreciate that the depicted example is not meant to imply architectural limitations with respect to the present invention.

Figure 10:
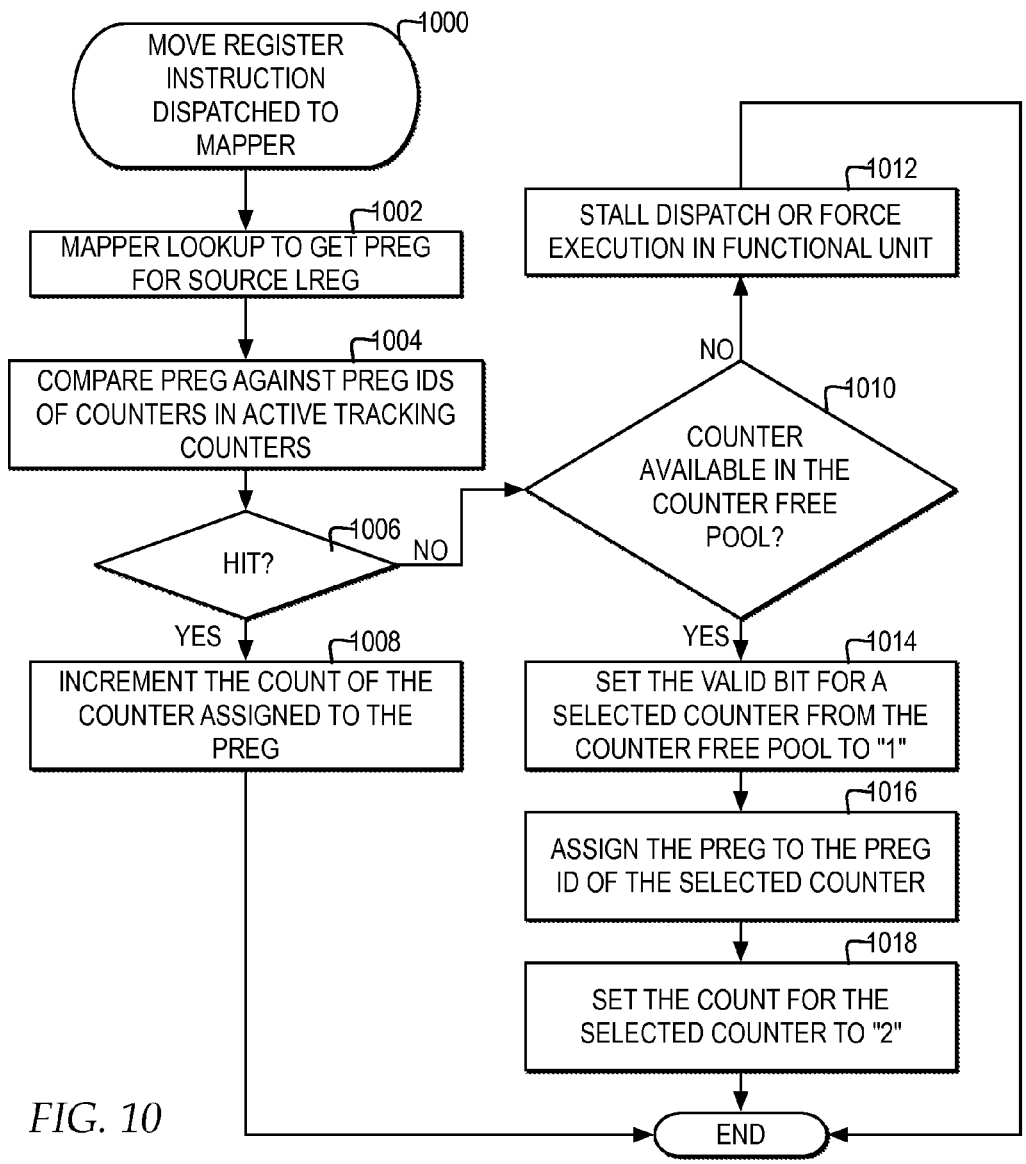
FIG. 10 is a high level logic flowchart illustrating a process and program for a mapper unit determining whether to dynamically assign a counter for a dispatched move register instruction or to increment the count of an existing counter tracking the PREG mapped to in the dispatched move register instruction.

FIG. 10 depicts a high level logic flowchart of a process and program for a mapper unit determining whether to dynamically assign a counter for a dispatched move register instruction or to increment the count of an existing counter tracking the PREG mapped to in the dispatched move register instruction. In the example, the process starts at block 1000 when a move register instruction is dispatched to the mapper and thereafter moves to block 1002. Block 1002 illustrates the mapper unit looking up the PREG mapped to by the source LREG in a move register instruction.

Next, block 1004 depicts comparing the returned PREG against the PREG IDs of counters in the active tracking counters, comprising a selection of the counters with a valid bit set to "1". Next, block 1006 illustrates a determination whether there is a "hit" from a match between the source PREG to a PREG ID of a counter with a valid bit set to "1". At block 1006, if there is a hit, then the process passes to block 1008. Block 1008 illustrates incrementing the count of the counter assigned to the PREG, and the process ends.

Returning to block 1006, if there is not a hit, then the process passes to block 1010. Block 1010 depicts a determination whether there is a counter available in the counter free pool with a valid bit set to "0". At block 1010, if no counter is available in the counter free pool, then the process passes to block 1012. Block 1012 illustrates stalling the dispatch or forcing execution of the instruction in the functional unit, depending on policies implemented by the mapper unit, and the process ends.

Returning to block 1010, if there is a counter available in the counter free pool, then the process passes to block 1014. Block 1014 depicts activating the counter by setting the valid bit for the selected counter from the counter free pool to "1". Next, block 1016 illustrates assigning the PREG to the PREG ID of the selected counter and block 1018 depicts setting the count for the selected counter to "2", reflecting the original allocation of the PREG along with the move register instruction reference to the PREG, and the process ends.

Figure 11:
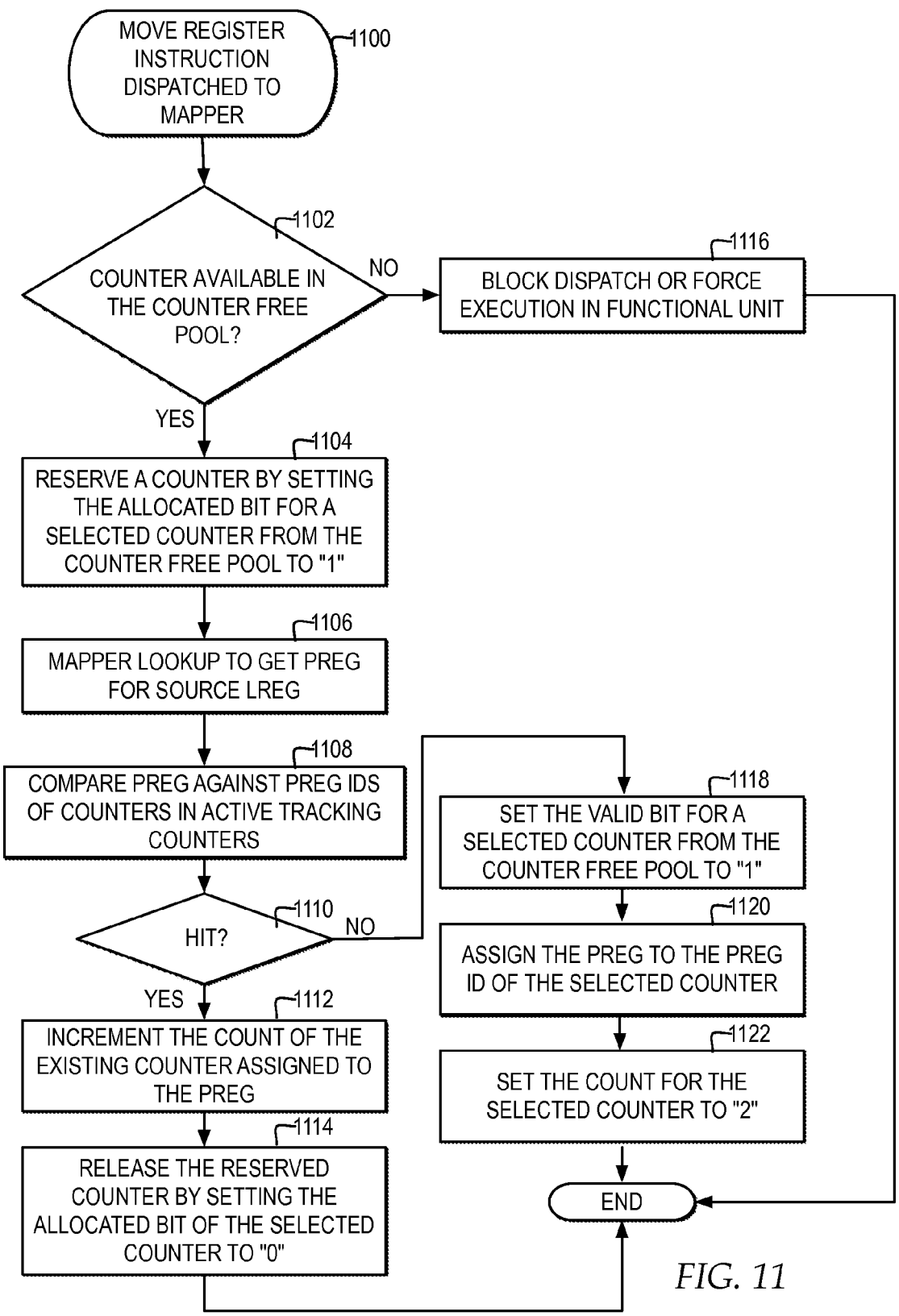
FIG. 11 is a high level logic flowchart illustrating a process and program for a mapper unit reserving a counter upon dispatch of a move register instruction.

FIG. 11 depicts a high level logic flowchart of a process and program for a mapper unit reserving a counter upon dispatch of a move register instruction. In the example, the process starts at block 1100, when a move register instruction is dispatched to the mapper, and thereafter proceeds to block 1102. Block 1102 illustrates a determination, whether a counter is available in the counter free pool with a valid bit set to "0" and an allocate bit, representing the allocation state of the counter, set to "0". At block 1102, if no counter is available in the counter free pool, then the process passes to block 1116. Block 1116 depicts blocking the dispatch of the move instruction or forcing execution in a functional unit, depending on policies implemented by the mapper unit, and the process ends.

Returning to block 1102, if a counter is available in the counter free pool, then the process passes to block 1104. Block 1104 depicts reserving an available counter by setting the allocate bit for the selected counter from the counter free pool to "1". By reserving a counter at the start of the process, the mapper unit ensures that a counter will be available to assign to the PREG if the PREG does not already have a counter assignment following mapper based execution of the move register instruction. Next, block 1106 illustrates the mapper unit looking up the PREG for the source LREG in the move register instruction. Thereafter, block 1108 depicts comparing the looked up PREG against the PREG IDs of the counters in the active tracking counters, with valid bits set to "1", and the process passes to block 1110.

Block 1110 illustrates a determination whether there is a "hit" from a match between the PREG to a PREG ID of a counter with a valid bit set to "1" in the active tracking counters. At block 1110, if there is a hit, then the process passes to block 1112. Block 1112 illustrates incrementing the count of the counter assigned to the PREG. Next, block 1114 depicts releasing the reserved counter by setting the allocate bit of the selected counter to "0", and the process ends.

Returning to block 1110, if there is not a "hit" from a match between the source PREG to a PREG ID of a counter with a valid bit set to "1", then the process passes to block 1118. Block 1118 illustrates setting the valid bit for the selected counter from the counter free pool to "1", block 1120 depicts assigning the PREG to the PREG ID of the selected counter, and block 1120 depicts setting the count for the selecting counter to "2", and the process ends.

Depending on the policy implemented by the mapper unit, when a mapper unit receives a move register instruction, the mapper unit determines whether to perform the steps illustrated in FIG. 10 or the steps illustrated in FIG. 11. In one example, if the mapper unit performs the steps illustrated in FIG. 10 and the process passes to block 1012, leading to a stall of the move register instruction, the mapper unit may implement a policy to perform the steps illustrated in FIG. 11 next, to ensure that a counter is reserved before performing the additional steps in the process. In another example, the mapper unit may implement a policy to perform the steps illustrated in FIG. 11 only when the number of counters available in the counter free pool drops below a minimum cap, when counter reservation would improve efficiency, or to perform the steps illustrated in FIG. 10 only when the number of counters available in the counter free pool exceeds a maximum cap, when counter reservation is not necessary.

Figure 12:
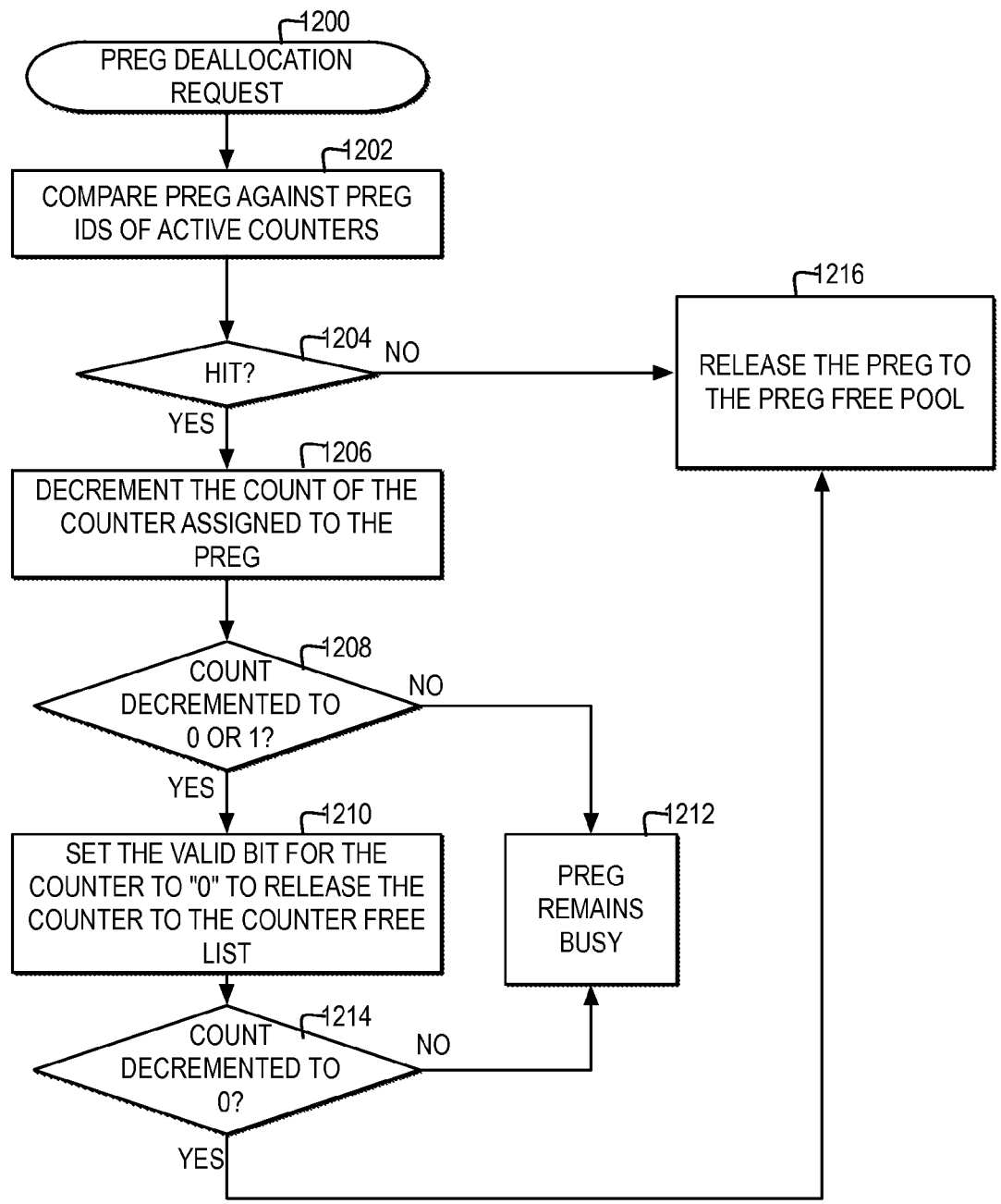
FIG. 12 is a high level logic flowchart illustrating a process and program for a mapper unit managing PREG deallocation requests.

FIG. 12 illustrates a high level logic flowchart illustrating a process and program for a mapper unit managing PREG deallocation requests. In the example, the process starts at block 1200 and thereafter proceeds to block 1202. Block 1202 illustrates comparing the PREG in the deallocation request against the PREG IDs of the active tracking counters. Next, block 1204 illustrates a determination whether there is a "hit" from a match between the release PREG and a PREG ID of an active tracking counter. At block 1204, if there is not a hit, then the process passes to block 1216. Block 1216 illustrates triggering the mapper unit to release the PREG to the PREG free pool, and the process ends.

Returning to block 1204, if there is a "hit", then the process passes to block 1206. Block 1206 illustrates decrementing the count of the counter assigned to the PREG. Next, block 1208 depicts a determination whether the count of the counter assigned to the PREG in the deallocation request is decremented to a "0" or a "1", which would indicate that the number of active mappings counted is less than a minimum value. At block 1208, if the count is not decremented to a "0" or a "1", then the process passes to block 1212. Block 1212 depicts the status of the PREG remaining busy, and the process ends.

Returning to block 1208, if the count is decremented to a "0" or a "1", then the process passes to block 1210. Block 1210 illustrates setting the valid bit for the counter to "0", and the process passes to block 1214. Block 1214 illustrates a determination whether the count is decrement to "0". At block 1214, if the count is decremented to "0", then the process passes to block 1216 and the mapper unit is triggered to release the PREG to the PREG free pool. At block 1214, if the count is not decremented to "0", then the process passes to block 1212 and the PREG status remains busy.

Figure 13:
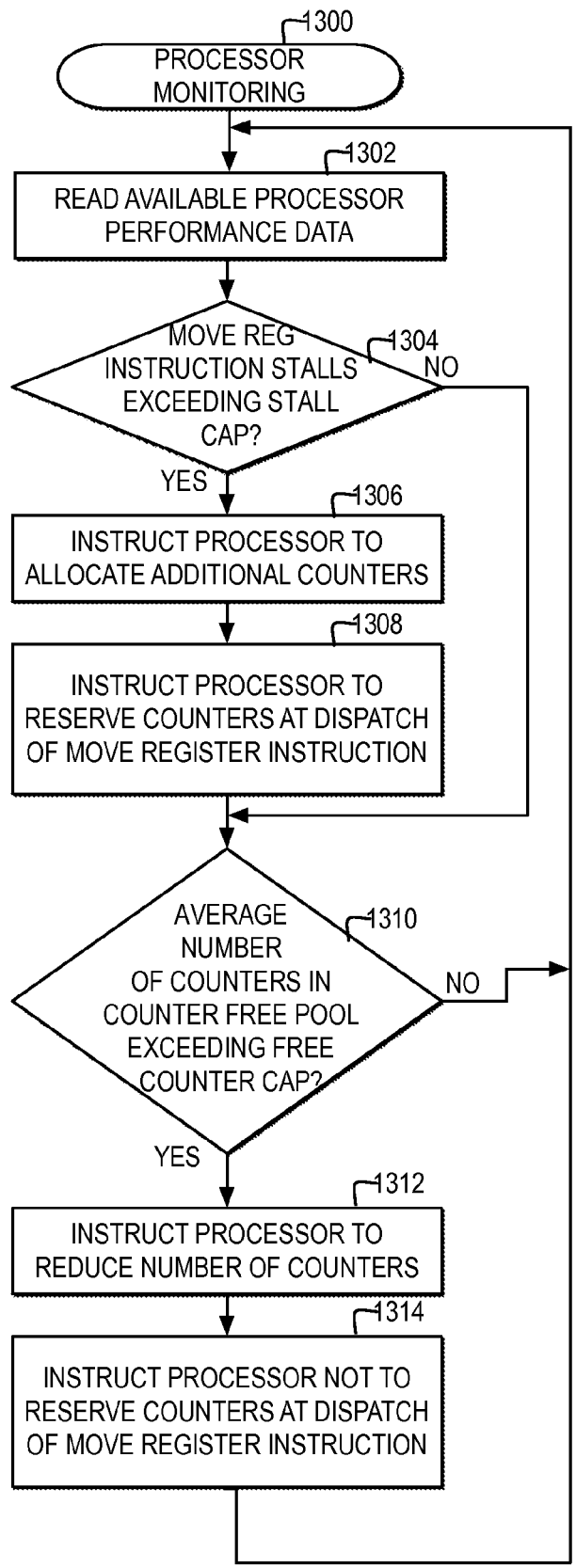
FIG. 13 is a high level logic flowchart illustrating a process and program for monitoring processor performance and adjusting hardware settings to improve performance for mapper based move register executions.

FIG. 13 illustrates a high level logic flowchart illustrating a process and program for monitoring processor performance and adjusting hardware settings to improve performance for mapper based move register executions. In the example, the process, which may be performed by software such as software 950, starts at block 1300 and thereafter proceeds to block 1302. Block 1302 illustrates reading available processor performance data. In one example, available processor performance data indicates each move register instruction stall by the dispatch unit and indicates a count of counters available in the counter free pool. It will be apparent to one skilled in the art that additional or alternate processor performance data may be read and that processor data may be read over time in order to detect processor performance.

Block 1304 depicts determining whether the detected move register instruction stalls over a period of time are exceeding a stall cap. If move register instruction stalls over a period of time are exceeding a stall cap, then the process passes to block 1306. Block 1306 illustrates instructing the processor to allocate additional counters. Next, block 1308 depicts instructing the processor to reserve counters prior at dispatch of move register instructions to the mapper unit.

Block 1310 illustrates determining whether the average number of counters in the counter free pool over a period of time exceed the counter cap. If the average number of counters in the counter free pool over a period of time exceed the counter cap, then the process passes to block 1312. Block 1312 depicts instructing the processor to reduce the number of counters. Next, block 1314 illustrates instructing the processor not to reserve counters at dispatch of move register instructions to the mapper unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A microprocessor comprising:
    a plurality of physical registers;
    a plurality of counters, wherein a number of the plurality of counters is less than a number of the plurality of physical registers;
    a mapper unit operative to assign a particular counter from among the plurality of counters currently in a counter free pool to count a number of mappings of logical registers from among a plurality of logical registers to a particular physical register responsive to an execution of an instruction by the mapper unit mapping a second logical register from among the plurality of logical registers to the particular physical register, wherein a first logical register from among the plurality of logical registers is currently mapped to the particular physical register;
    the mapper unit, responsive to the counted number of mappings of logical registers to the particular physical register decremented to less than a minimum value, operative to return the particular counter to the counter free pool.

2. The microprocessor according to claim 1, further comprising:
    the mapper unit, responsive to receiving a move register instruction requiring copying of a first logical register to a second logical register, for accessing the particular physical register mapped to by the first logical register;
    the mapper unit operative to execute the move register instruction, by the mapper unit, by mapping the second logical register to the particular physical register; and
    the mapper unit operative to broadcast a finish indicator for the move register instruction, by the mapper unit, to a completion tracking unit for tracking which instructions have finished, for the instruction, without passing the instruction to an issue queue.

3. The microprocessor according to claim 1, further comprising:
    the mapper unit, responsive to the mapper unit releasing a particular mapping of a particular logical register to the particular physical register, operative to decrement the count of the particular counter to decrease the count of the number of mappings of logical registers to the particular physical register.

4. The microprocessor according to claim 1, further comprising:
    the mapper unit, responsive to the counted number of mappings of logical registers to the particular physical register decremented to zero, operative to release the particular physical register to a physical register free pool.

5. The microprocessor according to claim 1, further comprising:
    the mapper unit, responsive to the mapper unit receiving the instruction, operative to look up the particular physical register mapped to by the source logical register in the instruction and searching the counter free pool for an available counter;
    the mapper unit, responsive to detecting the particular counter as available from the counter free pool, operative to activate the counter by setting a valid state of the particular counter to valid and assigning the particular counter to the particular physical register by setting a physical register identifier for the particular counter to the pointer of the particular physical register; and
    the mapper unit, responsive to not detecting an available counter from the counter free pool, operative to stall the instruction until the counter free pool comprises an available counter.

6. The microprocessor according to claim 1, further comprising:
    the mapper unit, responsive to the mapper unit receiving the instruction, operative to search the counter free pool for an available counter;
    the mapper unit, responsive to not detecting any available counter from the counter free pool, operative to stall the instruction;
    the mapper unit, responsive to detecting an available counter from the counter free pool, operative to reserve the available counter by setting an allocate state of the particular counter to reserve the available counter; and
    the mapper unit, responsive to the mapper unit executing the instruction, operative to compare the particular physical register to the active tracking counters;
    the mapper unit, responsive to the mapper unit identifying the particular counter already assigned to the particular physical register, operative to release the reserved available counter by clearing the allocate state;
    the mapper unit, responsive to the mapper unit not identifying the particular counter already assigned to the particular physical register, operative to assign the reserved available counter to the particular physical register.

7. A computer program product for counting mappings of logical registers to physical registers in a processor for instruction executions by a mapper unit of the processor, said computer program product tangibly embodied in a non-transitory computer-readable storage medium and comprising computer executable instructions which cause a computer to:
    assign a particular counter from among a plurality of counters currently in a counter free pool to count a number of mappings of logical registers from among a plurality of logical registers to a particular physical register from among a plurality of physical registers, responsive to an execution of an instruction by a mapper unit mapping a second logical register from among the plurality of logical registers to the particular physical register, wherein a first logical register from among the plurality of logical registers is currently mapped to the particular physical register, wherein the number of the plurality of counters is less than a number of the plurality of physical registers;

responsive to the counted number of mappings of logical registers to the particular physical register decremented to less than a minimum value, return the particular counter to the counter free pool.

* * * * *